United States Patent

Baumann

[15] 3,652,135
[45] Mar. 28, 1972

[54] METHOD AND ARRANGEMENT FOR PREVENTING THE LOCKING OF WHEELS OF A COMMERCIAL VEHICLE

[72] Inventor: Gunther Baumann, Stuttgart, Germany
[73] Assignee: Robert Bosch GmbH, Stuttgart, Germany
[22] Filed: Nov. 21, 1969
[21] Appl. No.: 878,685

[30] Foreign Application Priority Data
Nov. 26, 1968  Germany.....................P 18 10 950.7

[52] U.S. Cl............................303/21 CF, 188/181 C, 303/20
[51] Int. Cl.............................................................B60t 8/08
[58] Field of Search.............188/181; 303/21, 20; 307/120; 317/5; 324/160, 161; 340/52 R, 263

[56] References Cited

UNITED STATES PATENTS

| | | | |
|---|---|---|---|
| 3,026,148 | 3/1962 | Ruof | 303/21 CE |
| 3,235,036 | 2/1966 | Meyer et al. | 188/181 A |
| 3,245,213 | 4/1966 | Thompson et al. | 303/21 A |
| 3,401,984 | 9/1968 | Williams et al. | 303/21 A |
| 3,450,444 | 6/1969 | Ballard | 188/181 C |
| 3,511,542 | 5/1970 | Fielek, Jr. | 303/21 A |

Primary Examiner—Milton Buchler
Assistant Examiner—Stephen G. Kunin
Attorney—Michael S. Striker

[57] ABSTRACT

Pulses generated in synchronism with the rotation of the wheel are reshaped into measuring pulses having a steep leading edge and a slowly decreasing trailing edge. The pulses overlap. The instantaneous value of a measuring pulse at the beginning of a subsequent measuring pulse is compared with the corresponding value of a preceding measuring pulse, and a terminating signal terminating the application of the brakes, is furnished when the difference between two sequential so-determined instantaneous values exceed a predetermined difference.

16 Claims, 3 Drawing Figures

INVENTOR
Günther BAUMANN
By

Michael J Striker his ATTORNEY

METHOD AND ARRANGEMENT FOR PREVENTING THE LOCKING OF WHEELS OF A COMMERCIAL VEHICLE

BACKGROUND OF THE INVENTION

This invention relates to a method and arrangement for preventing the locking of the wheels of a commercial vehicle during a braking process. In particular, it relates to a method and arrangement wherein pulses are generated by the rotation of wheels, and circuits are provided which respond to these pulses and generate a terminating signal terminating the application of the brakes when it is indicated that the wheels are beginning to lock.

Traffic safety depends to a great extent on the proper functioning of the brakes of commercial vehicles. For safe braking, the vehicle should not depart from its course during the braking operation and must be stopped in the shortest possible distance. These requirements can only be met if the wheels do not lock during a braking process. Blocking of the wheels indicates that the tire slips on the street. This is known as skidding and it is well known that the coefficient of resistance is low during a skid. Thus the braking action is decreased. Furthermore, the vehicle is also more liable to side-wise movement, since the coefficient of resistance in the side-wise direction is also decreased substantially.

A conventional way of solving this problem is to connect a toothed gear of magnetically conductive material with the wheels of the vehicle and to attach pulse generating means to the body of the vehicle. When such a toothed wheel moves past the pulse generating means, the air gap between the pulse generating means and the toothed gear decreases, changing the inductivity of the section. The change in inductivity is then used to generate the pulse. Thus the pulse repetition rate of the so-generated pulses corresponds to the speed of the wheel. If these pulses are integrated, it is possible to derive a value indicative for the acceleration. When a wheel is locked, changes in the value indicative of the acceleration occur, which in turn are indicative of a locking of the wheels. However, this integration of pulses has the disadvantage that, due to the required time constant, a not inconsiderable delay occurs between the beginning of the actual braking of the wheel and the termination of the braking action.

SUMMARY OF THE INVENTION

An object of this invention is to furnish a method and arrangement for preventing the locking of wheels in commercial vehicles, without the above-mentioned drawbacks.

In accordance with the present invention, a pulse sequence is generated in synchronism with the rotation of the wheels. The so-derived pulses are reshaped into measuring pulses having an amplitude varying as a predetermined function of time. The beginning of any measuring pulse precedes in time termination of a preceding measuring pulse. The instantaneous value of a measuring pulse at a predetermined time instant following the start of the next sequential measuring pulse is compared with the corresponding value of a preceding measuring pulse and a comparison signal is generated as a function of the difference therebetween. A terminating signal, terminating the application of the brakes, is then furnished when the comparison signal corresponds to a difference exceeding a first predetermined difference. Such a terminating signal does not completely terminate a braking process that has begun, but simply causes the brakes to be lifted for a short time. If the danger of a blocked wheel re-occurs, the process of terminating the braking operation repeats also.

As a further feature of the method of the present invention, it is possible to cause the furnishing of the terminating signal to end if comparison of the above-mentioned instantaneous values indicates that the difference therebetween is less than a second predetermined difference.

In this manner, the brakes are automatically disconnected only as long as a danger of locking exits. The process repeats automatically until the particular braking operation has ended.

The measuring pulses into which the pulses generated in synchronism with the rotation of the wheels are reshaped, may either be of a sawtooth form or they may have a steep leading edge and a slowly decreasing trailing edge. The last-named measuring pulse is particularly easy to generate by means of a capacitor and resistors and particularly favorable operation results if the instantaneous values to be compared occur in the region of the trailing edge. The instantaneous values to be compared may be those values at which the steep leading edge of a measuring pulse and the trailing edge of the previous measuring pulse are equal—or it may be those points in the trailing edge of the measuring pulses which coincide with the beginning of the following measuring pulse.

In a preferred embodiment of the present invention, the comparison of the two instantaneous values is accomplished by use of two monostable multivibrators which are switched to the unstable state by means of an auxiliary pulse. The amount of time in which the two monostable multivibrators remain in the unstable state is determined by the amplitude of the instantaneous values to be compared. Thus the problem of determining the difference in time between two successive measuring pulses in order to determine the possibility of a locked wheel, is thus solved in a particularly simple manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
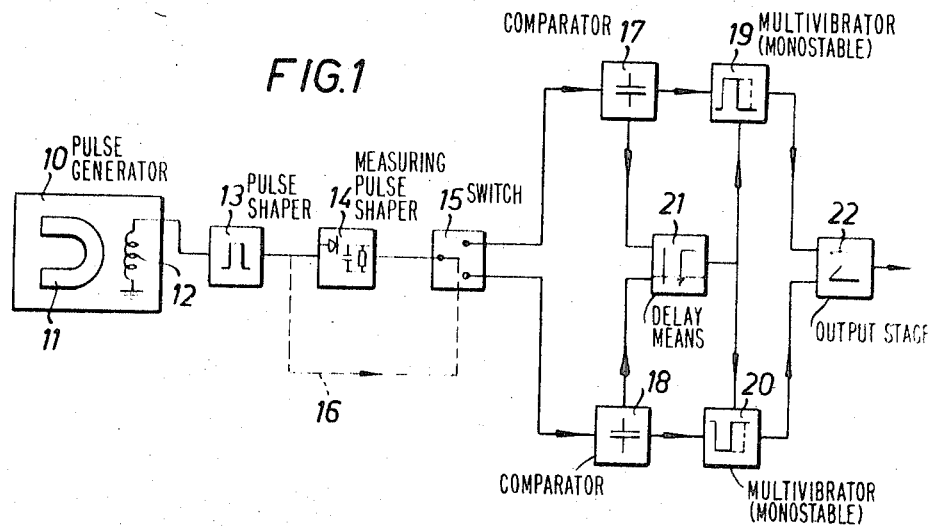
FIG. 1 shows an arrangement of the present invention utilizing two storages and two monostable multivibrators.

Pulse generating means, fastened to the body of a vehicle in such a manner that a pulse sequence is generated in synchronism with the rotation of a wheel, are denoted by reference numeral 10 in FIG. 1. The pulse generator 10 consists of a magnetic yoke 11, on which is fastened a winding 12. One terminal of this winding is connected to ground, while the other is connected with the input of a pulse shaping network 13, which shapes the pulses into pulses having a standard height and length, independent of the pulse repetition rate. The network 13 consists for instance of an monostable switch in connection to a Schmitt-trigger. The output of unit 13 is supplied to a unit 14 which comprises the means for reshaping the pulses in the sequence into measuring pulses. Units 13 and 14 together constitute pulse shaping means. Thus unit 14 furnishes a measuring pulse in response to each input pulse, this measuring pulse in response to each input pulse, this measuring pulse having a steep leading edge and a slowly decreasing trailing edge. This unit may, for example, comprise a capacitor which is charged rapidly, that is with a low time constant, and to which is connected a long time constant discharge circuit, as, for example, a discharge resistance. The measuring pulses are then fed to switching means, labeled 15 in FIG. 1, which, as indicated by dashed line 16, are operated in synchronism with the pulses in the pulse sequence. The switching means may, for example, operate in synchronism with the pulses at the output of unit 13. Switching means 15 have a first and second output, leading respectively to a first and second comparator storage means, denoted by reference numerals 17 and 18, respectively. The output of the first comparator storage is connected to the input of first monostable circuit means, for example a monostable multivibrator 19, while the output of the second comparator storage means is connected to the input of the second monostable circuit means, denoted by reference numeral 20 in FIG. 1. Each of the two storage units 17 and 18 furnishes a signal signifying the completion of a storage process. The signals are supplied to a delay unit 21 which in turn furnishes an auxiliary signal switching the two monostable multivibrators 19 and 20 into the unstable state. The auxiliary signal may be furnished after a delay time adjusted in said delay means. The amount of time that the two multivibrators remain in the unstable state depend upon the amplitude of the signal stored in storages 17 and 18, respectively. The output of the two monostable multivibrators are supplied to an output stage 22. Here it is determined by means of logic circuits, whether the monostable multivibrator 19 returns to the stable state prior or following the return to the stable state of monostable multivibrator 20. The terminating signal is furnished by the output stage 22, if a locking process is indicated.

Figure 3:
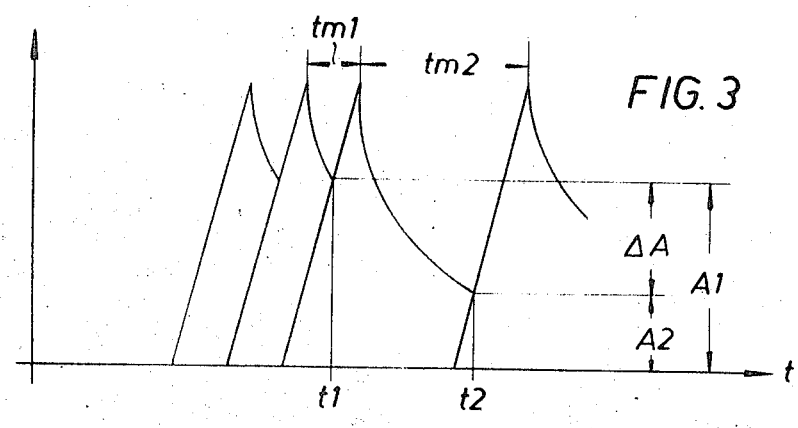
FIG. 3 shows the variation of several measuring pulses with respect to time.

In order to explain the arrangement in FIG. 1, it may be useful to refer to the sequence of measuring pulses illustrated in FIG. 3. These are the pulses that appear at the output of unit 14. Up to time $t1$, the pulse repetition rate is constant or decreases relatively slowly. This indicates that the particular wheel turns with constant angular velocity or slows up somewhat during a normal braking process. Two sequential measuring pulses are separated by a time interval $tm1$. In the particular examples shown, those instantaneous values of the measuring pulses are compared which occur when the leading edge of a measuring pulse intersects the slowly decreasing trailing edge of the preceding measuring pulse, that is when the two values are equal. A time $t2$, where a rather large delay has occurred, that is the distance $tm2$ between two consecutive measuring pulses, has increased considerably over the corresponding distance $tm1$ occurring at time $t1$. Because of the kinetic energy stored in the turning wheel, the wheel cannot suddenly lock between two measuring pulses, but the two instantaneous values A1 and A2 can differ so considerably, that a beginning of a locking process is indicated. Switching means 15 shown in FIG. 1 serve to store the instantaneous values to be compared (herein referred to as measuring signals) alternately in storages 17 and 18. These values are denoted by A1 and A2 in FIG. 3. Each time when a storing process has been completed, the relevant storage generates a signal from which the auxiliary signal is derived after a delay in the delay unit 21 which provides an adjustable delay. The auxiliary signal switches both monostable multivibrators, namely units 19 and 20 into the unstable state. If no locking has occurred, the values stored in storages 17 and 18 are substantially equal, thus resulting in the fact that the monostable multivibrators 19 and 20 remain in the unstable state for substantially the same time period. Therefore no terminating signal is furnished by output stage 22. If, however, a locking process is beginning, then the value A1 may be stored in storage 17, while the value A2 is stored in storage 18. In this case the two monostable multivibrators will return to the stable state at a different time interval. If this difference exceeds a first predetermined difference, then the terminating signal is furnished by the output stage 22. As soon as the difference between the two values is less than the second predetermined difference, the terminating signal is no longer furnished. In this way, a type of hysteresis is generated which may be adjusted to correspond to the particular vehicle and the particular tires in use. If, in this circuitry, the discharge resistor in unit 14 has a resistance which varies in dependence on the speed of the vehicle, then the trailing edge of the measuring pulses will decrease even more slowly at low speeds than at high speeds. As a result, great accuracy can be achieved over the whole range of wheel rotational speed, since the values to be compared always occur within a region of sufficiently steep decrease of the trailing edge of the measuring pulse.

In an alternate embodiment of the present invention, it is possible to compare instantaneous values not of two directly sequential measuring pulses, but of every third, fifth or every other, fourth or sixth measuring pulse may be compared. It is further possible that the monostable multivibrator are switched to the unstable state not after the storage in both storages has been completed, but after a new value has been entered into any one of the storages. Further, it is possible to omit the delay unit; the monostable multivibrators are then switched immediately following the entering of a new value into one or both storages. If the time that the monostable multivibrators 19 or 20 are in the unstable state is greater than the time between two measuring pulses, which is shown as $tm$ in FIG. 3, which may occur at the highest speed of the vehicle, then it is possible to break the connection between the unit 14 and switching means 15 during one operating cycle of the output stage 22. After each operating cycle, the arrangement comprising switching means 15, the two storages 17 and 18 and the two monostable multivibrators 19 and 20, that is the comparator means, then are reactivated for the subsequent operating cycle of the output stage 22.

Figure 2:
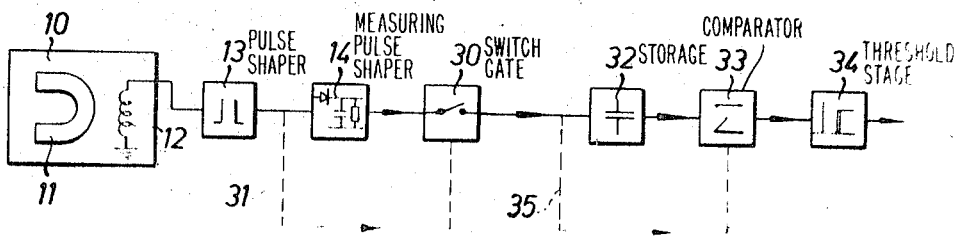
FIG. 2 shows an arrangement of the present invention using a single storage element.

In FIG. 2, an embodiment of the invention is shown which requires only a single storage. The output of unit 14, which serves to generate the measuring pulses as does the same numbered unit in FIG. 1, is connected to a gate 30. As indicated by the dashed line 31, this gate is operated by the pulses generated by the pulse shaping means 13. The output of gate 30 serves to supply the selected instantaneous values of the measuring pulses to the storage 32, whose output is connected with a comparator element 33. The output of the comparator element 33 is connected to a threshold element 34 at whose output the terminating signal is furnished if a particular threshold value has been exceeded and is connected to one input of the comparator element 33, as shown by the dashed line 35. This threshold value may be adjustable. This arrangement functions as follows: The instantaneous values of the measuring pulses which are to be compared are furnished to storage 32 via gate 30 and directly to the comparator element 33. If the wheel turns with a constant rotation speed, the stored values do not change. However, if the rotational speed decreases, so that the stored values change from the value indicated by A1 in FIG. 3 to that indicated by A2, then the comparator element 33 generates a signal resulting from this change in amplitude, whose magnitude corresponds to a difference between the two stored values. If this comparison signal exceeds the threshold value to which unit 34 has been adjusted, then the terminating signal is furnished. Similarly, this terminating signal is suppressed if the comparison signal indicates that the difference in magnitude is less than a second predetermined threshold value.

The circuit unit for use as storages as shown in FIGS. 1 and 2 may be amplifiers which have an integrated circuit in the forward path. It is particularly advantageous for the arrangement in FIG. 2, that the integrating amplifier has a nonlinear characteristic, which causes the slope of the leading edge of the output signal to be independent of the amplitude of the input signal, that is the output signal will rise to the value to be stored along the same sawtooth curve, independent of the input signal. If such a storage is used, it is further advantageous that the subsequently connected comparator element comprises a monostable multivibrator which is switched to the unstable state simultaneously with the beginning of each storage process. The time that the monostable multivibrator remains in the unstable state then constitutes the threshold value. If the monostable multivibrator returns to the stable position before the storage process has been completed, then the speed decrease in the wheel has exceeded the maximum allowable value, and a terminating signal is furnished.

Thus this invention allows the locking of the wheels to be prevented by use of relatively little additional equipment and in a simple, reliable, and very rapidly operating form.

Thus the problem to measure the time interval between two consecutive measuring pulses and to derive a terminating signal from possible changes in this time period, is solved in a simple fashion by the comparison of two instantaneous values in measuring pulses of a suitable form.

While the invention has been illustrated and described as embodied in circuits using monostable multivibrators, it is not intended to be limited to the details shown, since various modifications, circuit changes and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Arrangement for preventing locking of a wheel of a vehicle during a braking process, comprising, in combination, pulse generating means for generating a pulse sequence in synchronism with the rotation of said wheel; pulse shaping means for shaping the pulses in said sequence into measuring pulses having substantially identical leading portions and independently of speed substantially the same peak amplitudes and having trailing portions, the spacing of said pulses depending upon the speed of rotation of said wheel, each of said trailing portions having a portion overlapping in time with a portion of the leading portion of the next sequential one of said measuring pulses; means furnishing measuring signals corresponding to the instantaneous values of overlapping trailing portions of said measuring pulses at predetermined time instants within the corresponding overlapping leading portions of the following measuring pulses; comparing means comparing at predetermined time intervals sequential measuring signals and generating comparison signals as a function of the differences between sequential measuring signals; and terminating signal furnishing means for terminating the application of the brakes when at least one of said comparison signals corresponds to a difference exceeding a first predetermined difference.

2. An arrangement as set forth in claim 1, wherein said comparing means comprise first and second monostable circuit means, respectively adapted to stay in the unstable state for a time period corresponding to a first and second applied signal; auxiliary means for switching said monostable circuit means simultaneously into said unstable state; and switching means for alternately applying selected measuring signals to said first and second monostable circuit means for constituting said first and second applied signals.

3. An arrangement as set forth in claim 2, further comprising first and second comparator storage means connected to the output of said switching means, said first and second storage means respectively having a first and second storage output, said first and second storage output constituting said first and second applied signals.

4. An arrangement as set forth in claim 3, wherein said first and second storage means each comprise amplifier circuits having integrator circuits in the forward path.

5. An arrangement as set forth in claim 1, wherein said pulse generating means comprise a reactive reactance and means for changing the reactance of said reactive circuit abruptly during the rotation of a wheel.

6. An arrangement as set forth in claim 5, wherein said reactance is an inductance.

7. An arrangement as set forth in claim 5, wherein said reactance is a capacitance.

8. An arrangement as set forth in claim 5, wherein said pulse shaping means comprise a capacitor, short time constant means for charging said capacitor, and long time constant discharge means for discharging said capacitor, whereby said measuring pulses comprise a steep leading edge and a slowly decreasing trailing edge.

9. An arrangement as set forth in claim 8, wherein said long time constant discharge means comprise a resistance.

10. An arrangement as set forth in claim 9, wherein said resistance is a variable resistance, adapted to change in dependence on the speed of said engine.

11. Method for preventing locking of a wheel of a vehicle during a braking process, comprising, in combination, the steps of generating a pulse sequence in synchronism with the rotation of said wheel; reshaping the pulses in said sequence into measuring pulses having substantially identical leading portions and independently of speed substantially the same peak amplitudes and having trailing portions, the spacing of said pulses depending upon the speed of rotation of said wheel, each of said trailing portions having a portion overlapping in time with a portion of the leading portion of the next sequential one of said measuring pulses; furnishing measuring signals corresponding to the instantaneous values of overlapping trailing portions of said measuring pulses at predetermined time instants within the corresponding overlapping leading portions of the following measuring pulses; comparing, at predetermined time intervals, sequential measuring signals and generating comparison signals as a function of the difference between sequential measuring signals; and furnishing a terminating signal terminating the application of the brakes when at least one of said comparison signals corresponds to a difference exceeding a first predetermined difference.

12. A method as set forth in claim 11, further comprising the step of ending the furnishing of said terminating signal when said comparison signal corresponds to a difference less than a second predetermined difference.

13. A method as set forth in claim 11, wherein said measuring pulses comprise sawtooth pulses.

14. A method as set forth in claim 11, wherein said measuring pulses have a steep leading edge and a relatively slowly decreasing trailing edge.

15. A method as set forth in claim 14, wherein said predetermined time instants are the time instant at which the instantaneous value of the steep leading edge of a measuring pulse and the slowly decreasing trailing edge of a previous measuring pulse are equal in value.

16. A method as set forth in claim 11, wherein said predetermined time instants are the beginnings of said following measuring pulses.

* * * * *